Feb. 20, 1934. F. A. KING 1,948,236
PISTON MILLING AND TURNING MACHINE
Filed Aug. 17, 1931 4 Sheets-Sheet 3
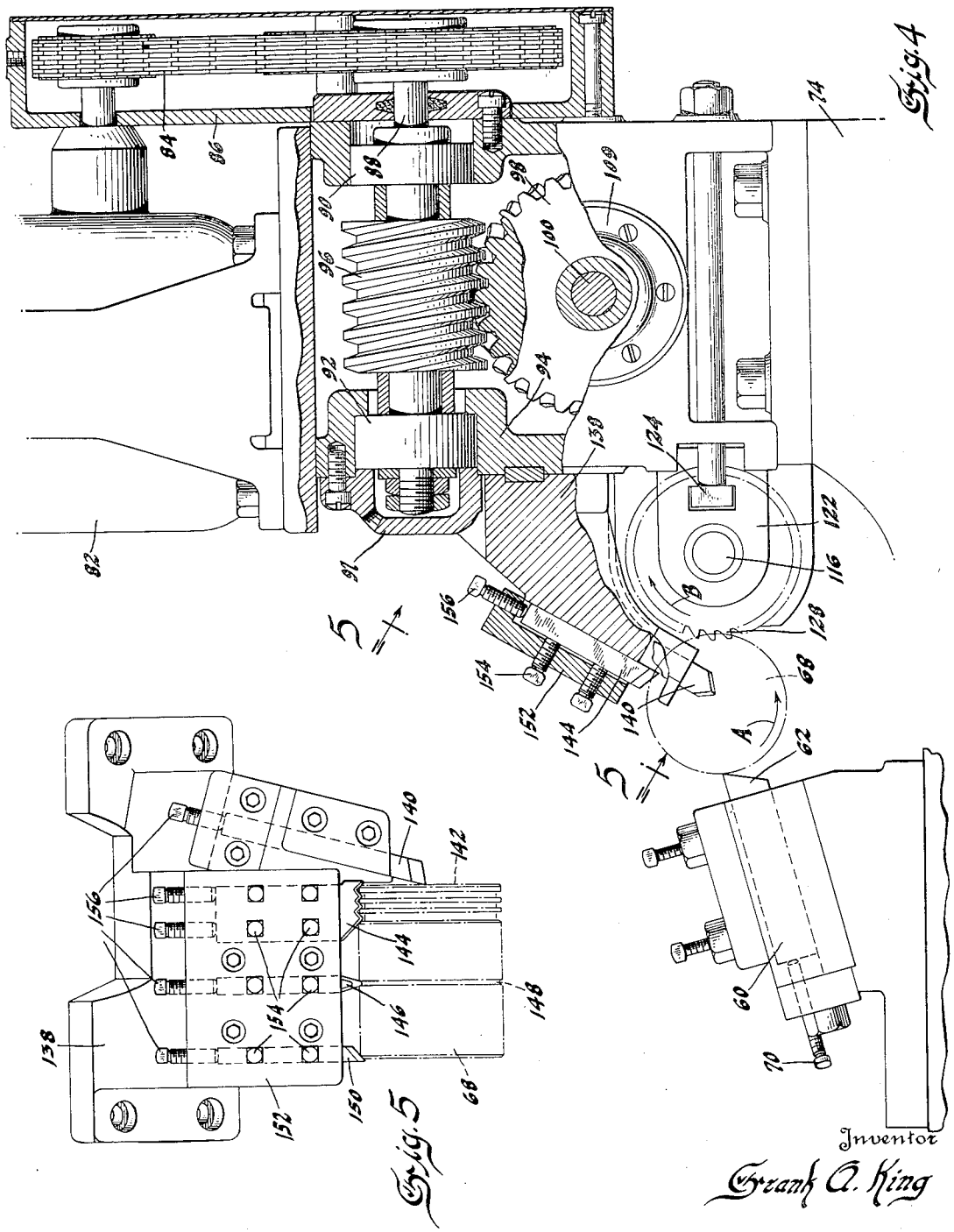
Inventor
Frank A. King
By Blackmore, Spencer & Hunt
Attorneys

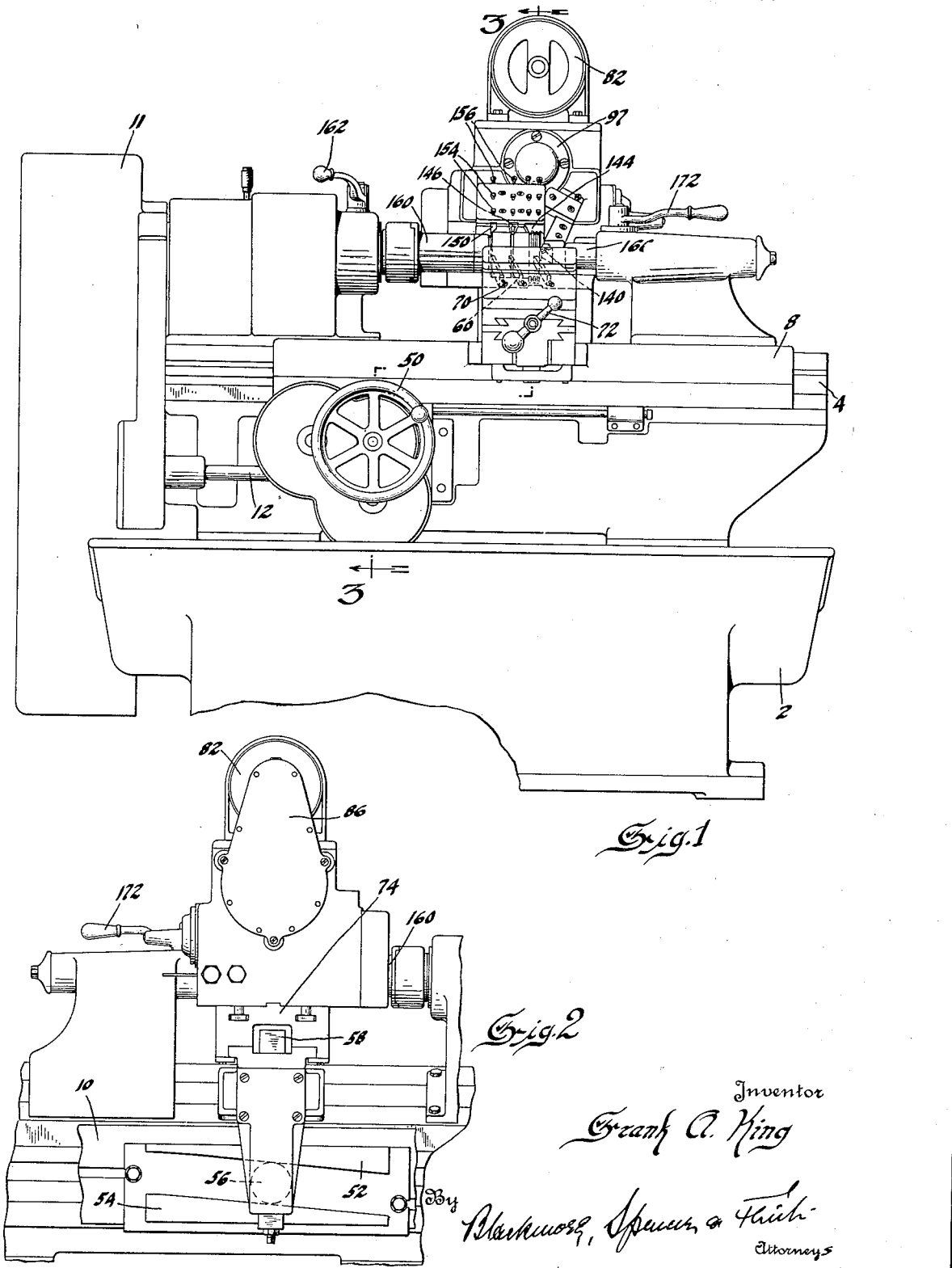
Feb. 20, 1934. F. A. KING 1,948,236
PISTON MILLING AND TURNING MACHINE
Filed Aug. 17, 1931 4 Sheets-Sheet 1

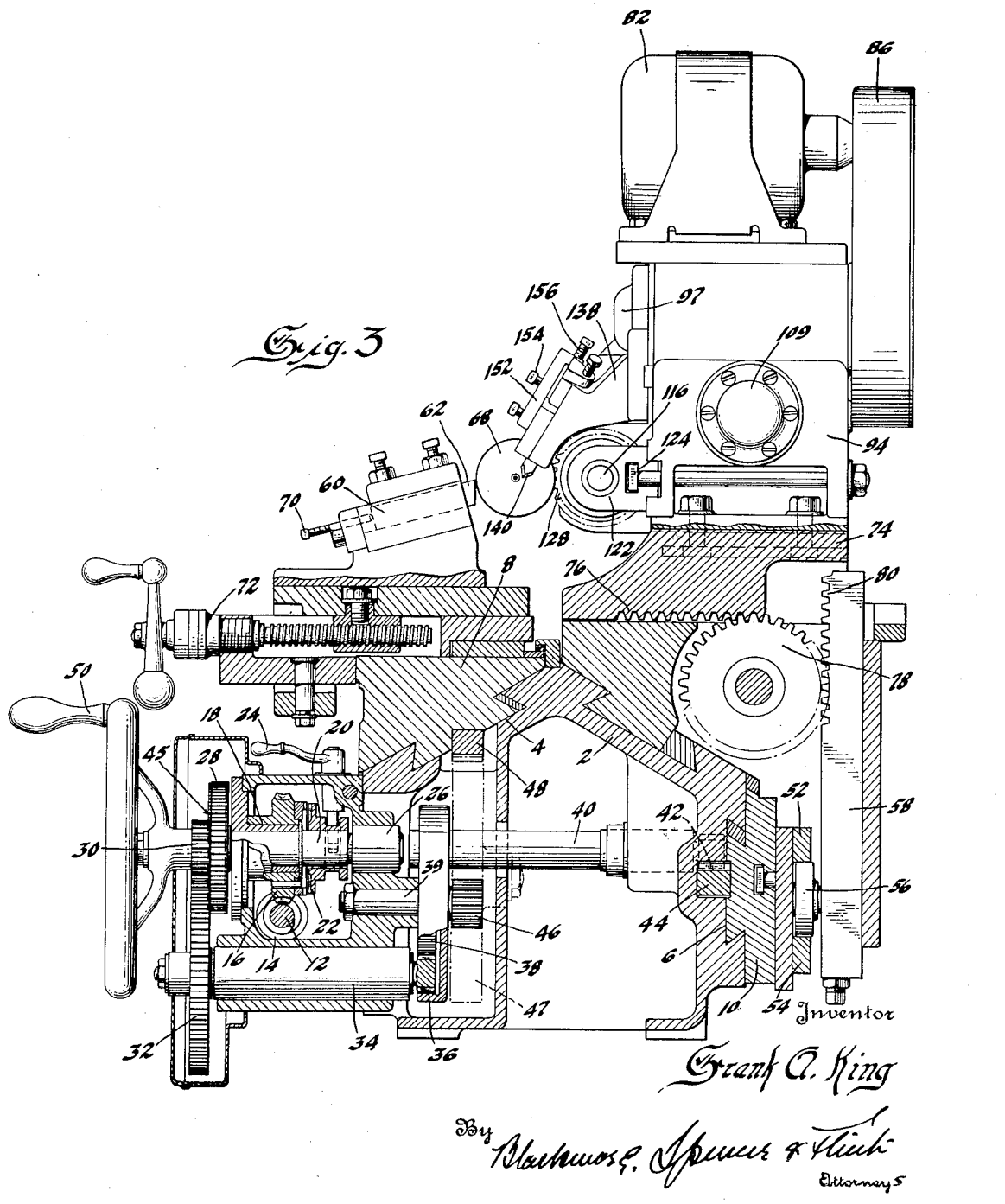

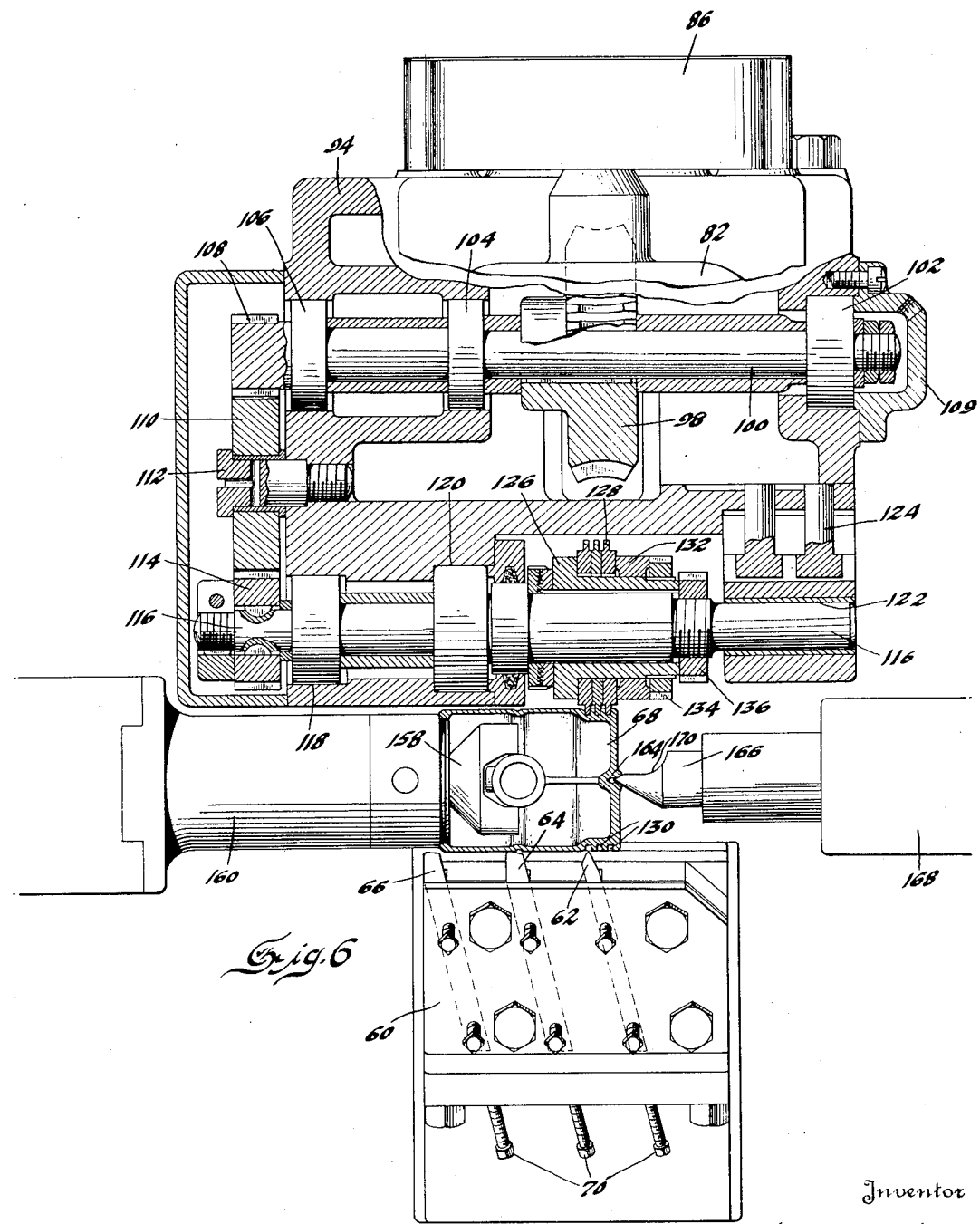

Patented Feb. 20, 1934

1,948,236

UNITED STATES PATENT OFFICE 1,948,236

PISTON MILLING AND TURNING MACHINE

Frank A. King, Lansing, Mich., assignor to General Motors Corporation, Detroit, Mich., a corporation of Delaware Application August 17, 1931. Serial No. 557,559

11 Claims. (Cl. 29—27)

This invention relates to a machine for milling and turning pistons used on internal combustion engines of automotive vehicles.

In the past, some difficulty has been experienced in making the piston ring grooves in the piston and at the same time maintaining a relatively high speed of rotation of the piston. It was necessary to hold down the speed of the piston to permit the tools which formed the piston ring grooves accurately to form the groove without injuring the tools or piston. At the same time, the tools which chamfered the grooves and the ends of the piston and the tools which turned the metal from the head end and the periphery of the piston, were capable of operating at a much higher speed. The use of the ordinary milling tool, therefore, retarded production because these tools would not permit the piston to rotate at the high speed allowed by the tools which turned off the metal at the head at their peripheral portion.

It is the object of the invention to enable the piston to be turned at a high speed and still properly form the piston grooves. To this end, use is made of a plurality of saws which are rotatably mounted on a slide which reciprocates relative to the piston. The piston is suitably mounted between fixtures which hold it at its two ends and rotate it at a relatively high speed, say 240 R. P. M. The saws rotate at a relatively lower speed, say 30 R. P. M. and the rotation of the saws is in a direction reverse to the rotation of the piston blank. In other words, the tangential movement at the point of contact between the saws and the piston will be in the same direction. This difference in relative rotation of the saws and piston blank will cause the blank (of the work) to overtake the saws (or the tool) and thereby cause the saws to cut the grooves in the piston.

On the drawings:

Figure 1 is a front view of a lathe embodying the novel features of the invention.

Figure 2 is a rear view of a portion of the same.

Figure 3 is a sectional view taken substantially on the line 3—3 of Figure 1.

Figure 4 is a partial sectional view through the mechanism which drives the same.

Figure 5 is a plan view taken on the line 5—5 of Figure 4.

Figure 6 is a sectional view at right angles to the structure of Figure 4 showing the mechanism for driving the saws and the tools for turning off the peripheral portion of the blank.

Referring to the drawings, the numeral 2 indicates the bed of the lathe. The lathe has the front trackway 4 and the rear trackway 6 to accommodate the slides 8 and 10. The slides are driven by an electric motor (not shown) through the intermediary of gears and a chain mounted in the housing 11 at the end of the machine. The gearing in the housing 11 drives the shaft 12 which has the worm 14 fixed thereto, which in turn drives the worm wheel 16 freely mounted on a collar 18 in which the transverse shaft 20 is journalled. A clutch 22 controlled by a handle 24 is adapted to throw the shaft 20 into and out of driven engagement with the worm wheel 16. The shaft 20 is journalled at its inner end in a bearing 26 and at its front end has the gears 28 and 30 rigidly secured thereto. The gear 30 meshes with a gear 32 which drives a shaft 34 having the gear 36 in its other end. The gear 36 meshes with the internal gear 38 which drives a shaft 39 having a gear 46 fixed to the end thereof. The gear 46 drives a gear 47 which meshes with and drives the rack 48 rigidly secured to slide 8. A gear 45 meshes with the gear 28 and drives a shaft 40, to the end of which there is secured the gear 42 which meshes with a rack 44 rigidly mounted on the slide 10. The gearing just described and operated from the shaft 12 is adapted to drive the slides 8 and 10 in the same direction when the tools are operating on the piston blank. To reverse the direction of movement of the slides, the operator throws out the clutch 24 and turns the hand wheel 50 which reverses the gearing.

Secured to the slide 10 are the two cam members 52 and 54 between which a roller 56 operates. The roller has rigidly secured thereto the rack 58 which is adapted to be reciprocated by the movement of the slide 10. The rack 58 has movement in a vertical direction (Figure 3) only.

Rigidly mounted on the slide 8 and adapted to move therewith is the tool holder or post 60 which has mounted thereon the tools 62, 64, 66, the purpose of which is to trim or turn off the excess metal at the periphery of the piston blank 68. The tools and carriage 60 are adjustable in the usual way by means of set screws 70 or the screw 72.

A slide 74 is mounted on the machine and is adapted to be reciprocated to and from the piston blank 68. The slide 74 has the teeth 76 on the bottom thereof with which meshes the gear 78 which is of a width sufficient to receive the teeth 80 of the rack 58. The upward movement of the rack 58 will therefore produce a forward movement (Figure 3) of the slide 74 and a downward movement of the rack 58 will move the slide 74 rearwardly.

The slide 74 has mounted on the top thereof an electric motor 82 which is connected by means of a chain drive 84 in the housing 86 with a gear secured to a shaft 88. The shaft 88 has bearings 90 and 92 in a housing 94 and a worm 96 is rigidly mounted on the shaft. A cap 97 incloses the shaft end in the housing 94. The worm meshes with a worm wheel 98 also enclosed in the housing and secured to a shaft 100 which has the bearings 102, 104 and 106 in the housing 94. The shaft extends beyond the sides of the housing and at one end has the gear 108 secured thereto. The other end is concealed by a cap 109. The gear 108 meshes with an idler 110 journally mounted on the housing by means of the stud 112. The gear 110 in turn meshes with the gear 114 keyed to a shaft 116 mounted in bearings 118, 120 in the housing 94 and in a bearing 122 removably secured to the housing by means of the bolts 124. Between the bearings 120 and 122, the shaft 116 has rigidly mounted thereon the collar 126 on which there are rigidly secured the saws 128 which cut the piston ring grooves 130 in the piston blank 68. The saws are held in place by means of the members 132 and 134 while the collar 126 is held in place by means of the member 136 threaded on to the shaft 116.

Secured to the housing 94 immediately over the saws 128 is a bracket 138 in which there are mounted (1) the tool 140 which turns off the excess metal from the head end 142 of the piston, (2) the tool 144 which chamfers the edges of the piston ring grooves and the head end of the piston, (3) the tool 146 which forms the oil groove 148, (4) and the tool 150 which chamfers the hollow end of the blank 68. These tools are secured in place by means of the holder 152 secured to the bracket 138 by means of the four machine bolts shown in plan in Figure 5. Set screws 154 and 156 are used to adjust the tools 140, 144, 146 and 150.

The blank 68 is mounted at one end on the fork 158 which is driven from a shaft enclosed in the bearing member 160 and which shaft is driven from the gear in the housing 10. A lever 162 is used to operate a clutch which controls the shaft operating the fork 158. The prongs of the fork are adapted to fit on opposite sides of the bosses which receive the wrist pin. The opposite end of the piston has a central recess 164 in which there is received the point of a piloting member 166 journally mounted in the stock 168. The piloting member or lathe center 166 has a portion 170 cut away therefrom, the purpose of which is to allow the tool 140 to cut away all of the excess metal from the end of the piston. If provision were not made for the portion 170, the tool 140 would cut into the piloting member 166. A lever 172 is provided, the purpose of which is to withdraw the pilot member 166 to permit the insertion or removal of a new piston blank.

By referring to Figure 4, it will be noted that the arrow A on the piston blank indicates the direction of rotation of the piston. The speed of rotation of the piston blank may, for example, be 240 R. P. M. This is much too fast for the ordinary non-rotatable tool which cuts the grooves in the piston. The arrow B indicates the direction of rotation of the saws 128. From the direction of the arrows, it will be noted that the direction of rotation of the work is opposite to the direction of rotation of the saws or, considering a tangent at the point of contact of the saws with the piston blank, the tangential direction of movement is the same. Owing to the fact that the work rotates much faster than the saws, the work will catch up to or run into the saws to cause the latter to cut the grooves into the piston blank. This differential in the direction of rotation of the saws and the blank will allow the saws to cut the piston ring grooves in a satisfactory manner without damaging the saws or making rough grooves in the piston.

The operation of the device is as follows. Assuming that the lever 162 has thrown off the power from the shaft driving the fork 158 and the lever 24 has thrown out the clutch 22, the operator operates the lever 172 to withdraw the pilot 166. The slide 74 is now at its rearmost position of the machine and the tool support 60 is at its extreme right hand position. A piston blank 68 may now be inserted over the fork 158 and the lever 172 again operated to cause the pilot 166 to engage in the opening 164. The blank is now ready to be rotated. The operator now throws the levers 162 and 24 to engage the clutches and cause the piston blank 68 and the slides 8, 10 and 74 to operate. The operation of the slide 8 will push the tool post 60 and its tools 62, 64 and 66 past the piston blank to turn excess metal from the periphery of the blank. The slide 10 will move the cam 52, 54 and cause the roller 56 to move the rack 58 upwardly which will rotate the gear 78 and move the slide 74 to the left (Figure 3) to cause the saws 128 and tools 140, 144, 146 and 150 to engage the blank. The differential rotation of the blank and saws will cause the blank to run into the saws to cut the grooves and after the grooves have been started, the tool 144 performs the chamfering operation. The tools 146 and 150 at the proper time will engage the blank to form the oil groove 148 and the chamfer at the hollow end of the post. Simultaneously, the tool 140 will be moved across the end face of the piston to shape the piston head. When the tools have performed their work, the operator again throws off the power by operating the levers 162 and 24 and then operates the handle 50 to reverse the slides to bring them to their inoperative position. By releasing the handle 172, the shaped piston may now be removed and a new blank inserted. The structure of the handle 172 and of the piston releasing mechanism associated therewith is no part of the invention and is well known in the lathe art.

I claim:

1. In a piston milling and turning machine, a plurality of rotatable saws for cutting piston ring grooves into the piston, means to rotate said saws and means to rotate said piston, said piston and saws rotating in the same tangential direction at their place of contact but at different speeds, tools to chamfer the edge of the grooves and the piston ends, means to move said saws and tools toward and away from the piston, a plurality of tools for turning off the metal at the periphery of the piston, means for moving said last-named tools past the piston.

2. In a piston milling and turning machine, means for holding and rotating a piston blank, a slide movable to and from the blank, a plurality of saws mounted on the slide and rotatable in a direction opposite to the rotation of the piston, said piston blank rotating faster than the saws whereby the blank overtakes the saws and causes the saws to cut grooves into the blank, and means for turning metal from the end and periphery of the piston simultaneously with the cutting of the grooves.

3. In a piston milling and turning machine, means for holding and rotating the piston blank, a slide movable to and from the blank, a plurality of saws mounted on the slide and adapted to engage the blank to cut piston ring grooves therein, means for rotating the saws in a direction opposite to the rotation of the piston, said blank rotating faster than the saws whereby the work overtakes the saws to cause the saws to cut grooves into the blank, and tools movable with the slide to chamfer the grooves and piston ends and to turn off the end of the piston.

4. In a piston milling and turning machine, means for holding and rotating the piston blank, a slide movable to and from the rotating blank, a plurality of saws mounted on the slide and adapted to engage the blank to cut piston ring grooves therein, means for rotating the saws in a direction opposite to the rotation of the piston, said blank rotating faster than the saws whereby the work overtakes the saws to cause the saws to cut grooves into the blank, and tools movable with the slide to chamfer the grooves and piston ends and to turn off the end of the piston, a second slide movable past the blank, and tools on the slide to turn off metal at the periphery of the blank.

5. In a piston milling and turning machine, means for holding a piston blank and rotating it at high speed, a plurality of saws for cutting piston ring grooves in the blank, means for rotating said saws in a direction opposite to the rotation of the blank and at a lower speed, whereby the blank overtakes the saws and causes the cutting of grooves, and means to remove excess metal from the outside of the piston simultaneously with the cutting of the grooves.

6. In a piston milling and turning machine, means for holding a piston blank and rotating it at a high speed, a slide reciprocable relative to said blank, a plurality of saws rotatably mounted in said slide and adapted to engage the blank to cut grooves therein, said saws rotating at a speed much less than the speed of the blank and in the opposite direction, whereby the blank overtakes the saws to cause the latter to cut the grooves.

7. In a piston milling machine, means for holding and rotating a piston blank, a slide reciprocal relative to said blank, a plurality of saws rotatably mounted in said slide adjacent the blank and adapted to cut piston ring grooves therein, said saws rotating at a speed less than the speed of the blank and in the opposite direction, whereby the blank overtakes the saws to cause the latter to cut the grooves.

8. In a milling machine, means for rotating a piece of work, a cutter to mill the work and mounted for rotation adjacent the work, said cutter and work rotating in opposite directions at different rates of speed, and means to move said cutter bodily toward and away from the work laterally of the work.

9. In a milling machine, means for rotating a piece of work a cutter mounted for rotation adjacent the work and in a direction opposite thereto, said cutter rotating at a speed less than the speed of the work to cause the work to overtake the cutter to mill the work, and means to move said cutter bodily toward and away from the work laterally of the work.

10. In a piston milling and turning machine, a plurality of tools simultaneously operable on a piston, said tools including a plurality of rotatable tools for removing metal from the piston to form grooves in the periphery of the piston, means to rotate said tools and more them relative to the work, tools for chamfering the edge of said grooves and the ends of the piston, means for moving said chamfering tools to and from the piston, tools for turning off the ends of the piston, means for moving said turning-off tools to and from the piston, a tool for turning off the metal at the cylindrical surface of the piston, and means to operate said last named tool to cause it to engage the piston, all of said means being operatively interrelated and operating simultaneously and in unison.

11. In a piston milling and turning machine, means for holding and rotating a piston blank, a slide movable to and from the piston blank, a plurality of saws rotatably mounted on said slide to cut piston ring grooves in the blank, means to rotate the saws, tools on the slide engaging the blank simultaneously with the operation of the saws to chamfer the edge of the grooves and the piston ends, a second slide movable past the piston, a plurality of tools on the second slide simultaneously to turn off the metal at the cylindrical surface of the piston, means to operate the second slide to cause its tools to perform their work simultaneously with the work of the other tools, all of said means being operatively interrelated and operating simultaneously and in unison.

FRANK A. KING.